United States Patent [19]

Kalajzich

[11] 4,175,629

[45] Nov. 27, 1979

[54] ELECTRIC DRIVE UNIT FOR VEHICLES

[75] Inventor: Albert A. Kalajzich, Brooklawn, N.J.

[73] Assignee: General Engines Co., Inc., Thorofare, N.J.

[21] Appl. No.: 889,336

[22] Filed: Mar. 23, 1978

[51] Int. Cl.² .................... B62D 61/02; B62D 61/08; B60K 1/00; B60K 17/14
[52] U.S. Cl. .................................. 180/220; 180/222; 180/74; 74/501 R
[58] Field of Search ................... 180/33 D, 31, 74; 74/501 R

[56] References Cited

U.S. PATENT DOCUMENTS

| 2,180,442 | 11/1936 | Tondeur | 74/501 |
| 2,586,082 | 2/1952 | Piatti | 180/33 D |
| 3,905,442 | 9/1975 | O'Neill | 180/33 D |

FOREIGN PATENT DOCUMENTS

| 53604 | 9/1937 | Denmark | 180/33 D |
| 452680 | 11/1927 | Fed. Rep. of Germany | 180/33 D |
| 232087 | 4/1925 | United Kingdom | 180/33 D |

*Primary Examiner*—John P. Silverstrim
*Attorney, Agent, or Firm*—John N. Randolph

[57] ABSTRACT

An electric drive unit for vehicles which are normally rider propelled, such as bicycles and tricycles, has a wheel driven by an electric motor for propelling the vehicle by frictional engagement with the front wheel tire. A control lever mounted on the handlebar is manually actuated to exert a pull on a cable which is slidably encased in a flexible sheath which is incapable of contracting. A support for the lever provides a fixed abutment for an upper end of the sheath, so that the motor mounting bracket, against which the lower end of the sheath abuts and which is yieldably supported, is displaced downwardly, by distortion of the sheath, to move the friction wheel into engagement with the vehicle tire. A two post electric switch which is connected to and moves in unison with the motor mounting bracket engages a fixed abutment when it moves downwardly for closing the switch to energize the electric motor carried by said motor bracket, for driving the friction wheel in a direction for rotating the front wheel tire in a forward direction. The yieldable support for the motor bracket raises said bracket to lift the friction wheel out of engagement with the tire and to allow the electric switch to resume a normal open position when the manual pressure applied to the control lever is released.

5 Claims, 6 Drawing Figures

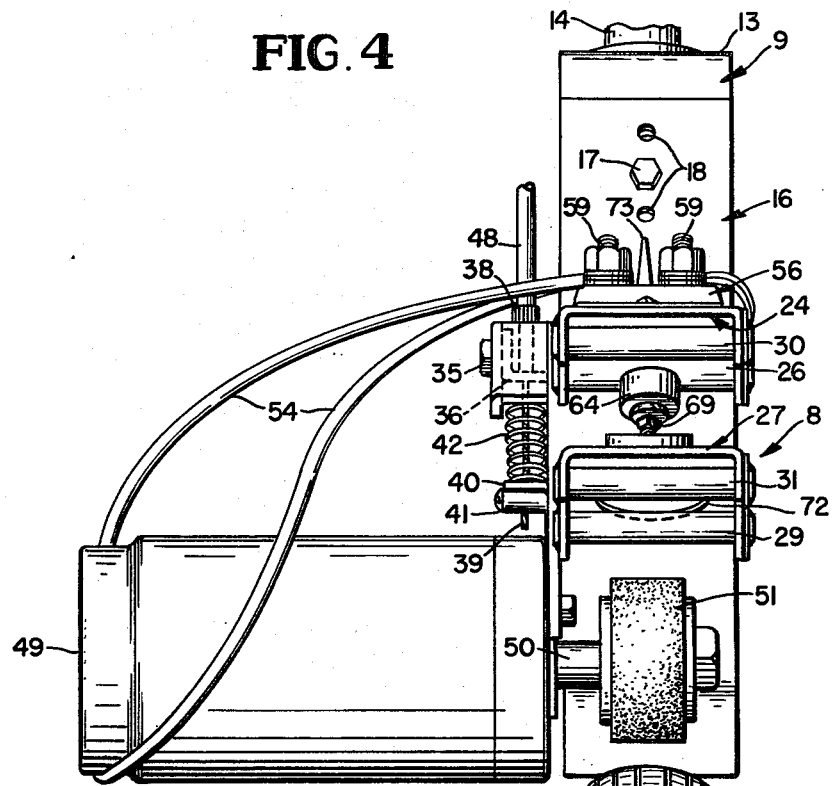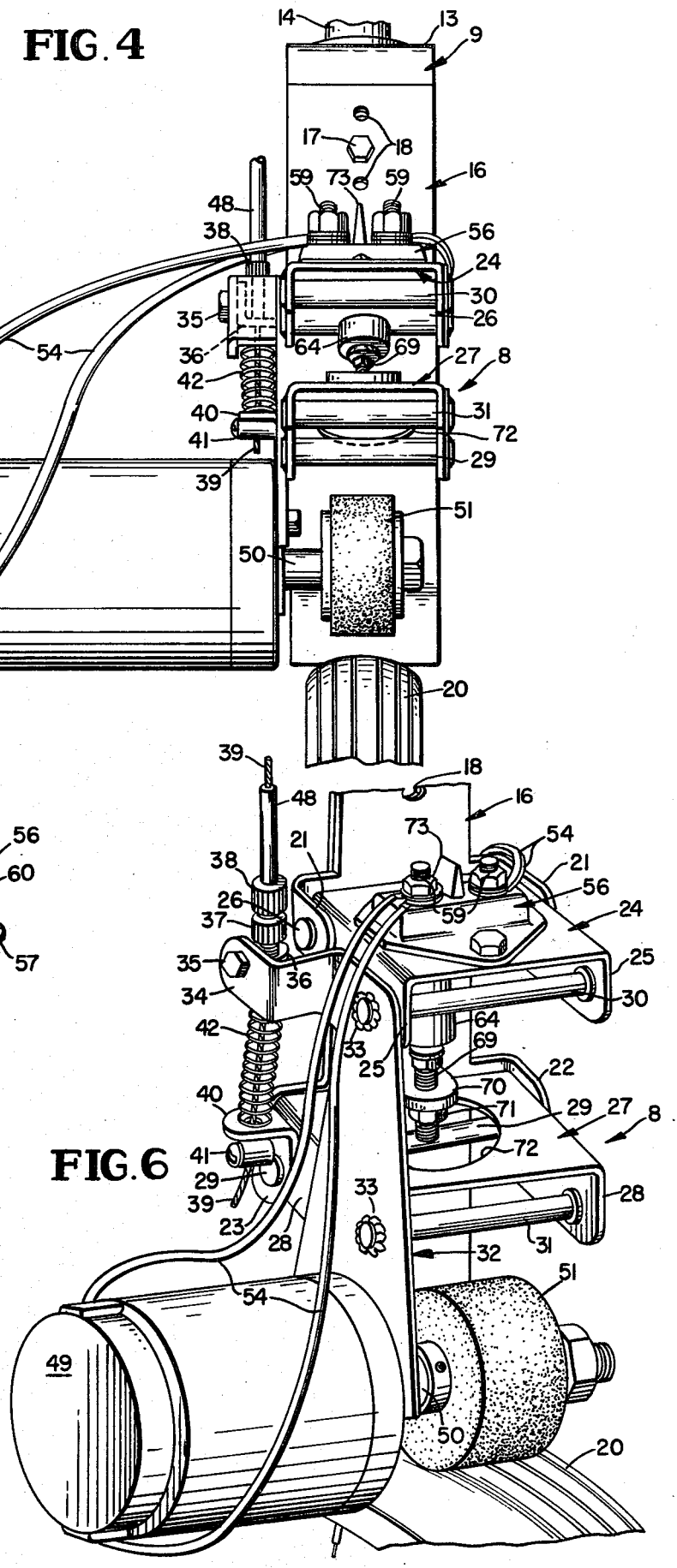

ELECTRIC DRIVE UNIT FOR VEHICLES

BACKGROUND OF THE INVENTION

The present invention functions similarly to the electrically driven assist unit as disclosed in U.S. Pat. No. 3,905,442, issued Sept. 16, 1975, but accomplishes all of the same results and functions while utilizing a greatly simplified construction involving fewer parts.

SUMMARY

A primary object of the present invention is to provide an electric drive unit for bicycles and tricycles of lightweight construction composed of few parts and which can be economically manufactured, yet which is extremely efficient and durable in operation and requires a minimum of maintenance.

An important object of the invention is to provide a unique means of converting a force exerted by pressure applied to a lever, mounted on the vehicle handlebar, into a downward thrust exerted on a motor mounting bracket for displacing a friction wheel, driven by a motor carried by said bracket, into engagement with the front wheel tire of the vehicle.

Another object of the invention is to provide an electric switch which is connected to the motor mounting bracket and which moves downwardly therewith into engagement with a fixed abutment for closing the switch to energize the motor as the friction wheel moves into engagement with the front wheel tire.

Still a further object of the invention is to provide a yieldable support for the motor mounting bracket which normally supports said bracket and the parts connected thereto and carried thereby in raised, inoperative positions.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 4 is a front elevational view of the drive unit, as it appears in FIG. 2;

FIG. 5 is a central sectional view of the electric switch, and

FIG. 6 is a fragmentary perspective view of the drive unit.

DESCRIPTION OF THE PREFERRED EMBODIMENT

Figure 1:
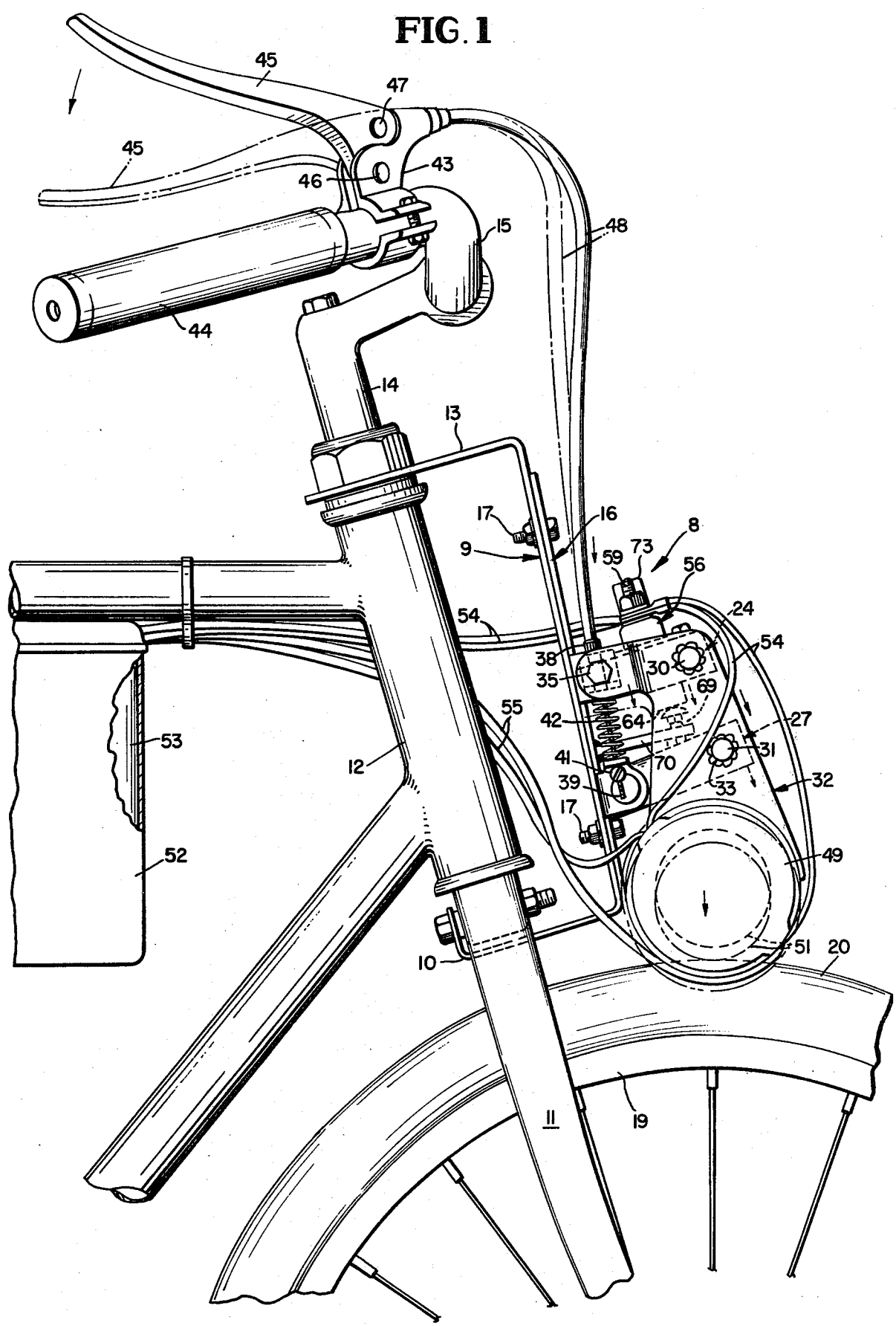
FIG. 1 is a side elevational view of an electric drive unit shown mounted on the front of a bicycle.
Figure 2:
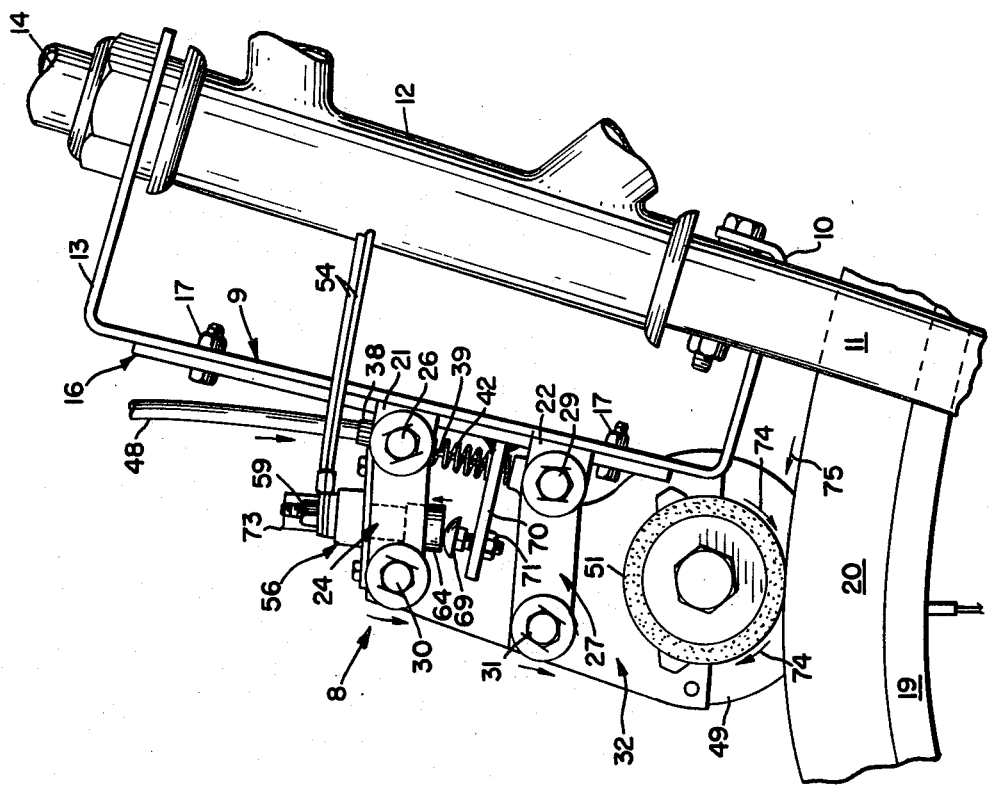
FIG. 2 is a fragmentary side elevational view looking toward the opposite side of said drive unit and showing the drive unit in an inoperative position.

Referring more specifically to the drawings, the electric drive unit in its entirety and comprising the invention is designated generally 8 and includes a bicycle mount bracket 9 having a lower portion 10 which is secured to the front wheel fork 11, below the bicycle frame 12, and an upper part 13 which engages around the handlebar post 14 above the frame 12, so that said bracket 9 moves with the fork 11, post 14 and handlebar 15.

An elongated mounting base 16 is secured to and supported on a front side of the bracket 9 by nut and bolt fastenings 17. The base 16 is provided with vertically spaced openings 18, FIG. 4, for selectively receiving the fastenings 17, for adjusting the location of the base 16 above the front wheel 19 and its tire 20. Bracket 9 and base 16 combine to form a support means for mounting the drive unit 8 on the bicycle.

The base 16 has extensions projecting from the side edges thereof which are provided with out-turned terminals forming two pairs of ears, including an upper pair 21 and a lower pair 22,23. An upper platform 24 has downturned side flanges 25. Corresponding ends of said flanges 25 fit between the ears 21 and are connected thereto by a spindle 26 which extends through the ears 21 and flanges 25, for mounting the platform 24 on the base 16 for vertical swinging movement. A lower platform 27 has downturned side flanges 28, corresponding ends of which fit between the ears 22,23 and which are connected thereto by a spindle 29, to enable the platform 27 to also swing vertically relative to the base 16.

A spindle 30 extends through the flanges 25, adjacent their other outer ends, and a spindle 31 extends through the flanges 28, likewise adjacent the other ends thereof. Corresponding ends of the spindles 30 and 31 extend through a plate constituting a motor supporting bracket 32, and said spindle ends are provided with welds 33, or the like, to retain the bracket 32 thereon. Spindles 30 and 31 and their welds 33 are capable of rotating relative to the bracket 32. The bracket 32 is mounted on the outer side of the flange 28 which engages the ear 23, and on the outer side of the flange 25 which is disposed directly above said flange 28.

The upper end of the bracket 32 has an outwardly offset terminal portion 34 in which is mounted a fastening 35. The inner end of said fastening 35 is in the form of a plate 36. A sleeve 37 is threaded downwardly through the plate 36 and is internally threaded to receive a cable adjuster 38 which is threaded downwardly into the upper end of the sleeve 37. A non-elastic flexible cable 39 has one end extending downwardly through the cable adjuster 38, the sleeve 37, and through a lip 40 which projects outwardly from the upper edge of the ear 23. A cable clamp 41 is adjustably secured to the cable 39 and bears against the underside of the lip 40. A return assist spring 42 is disposed around the cable 39 and has its lower end resting on the lip 40 and its upper end bearing against the underside of the plate 36.

A clamp 43 is detachably secured around the handlebar 15, adjacent one of its handgrips 44, and is provided with a lever 45 which is pivotally connected at 46 to the clamp 43, for mounting said lever above the handgrip 44 for swinging movement toward and away from said handgrip, as seen in full and dotted lines in FIG. 1. The lever 45 is provided with a clamping fastening 47 by means of which the other end of the cable 39 is secured to said lever. The clamp 43 and its lever 45 are conventional. A sheath or sleeve 48 which is flexible but incapable of stretching or contracting, encases the cable 39, between the clamp 43 and cable adjuster 38. One end of the sheath 48 abuts against the forward end of the clamp 43 and the other end thereof bears on the upper end of the cable adjuster 38.

An electric motor 49 is secured to the outer side of the lower portion of the mounting bracket 32 and has a driveshaft 50 extending inwardly from the bracket 32 and on which is secured a drive wheel 51, which is disposed directly over the tire 20, as best seen in FIG. 4.

A carrying case 52 containing a storage battery or batteries 53 is supported on a part of the frame 12 and has a pair of positive conductors 54 leading from the battery to the motor 49 and a pair of negative conductors 55 leading from the motor 49 back to the battery 53. The motor 49 is of the four brush type, but other conventional types of electric motors could be used.

An electric switch 56 is secured on the upper platform 24. As best seen in FIG. 5, the switch 56 includes a housing 57 having a top wall 58 through which project two posts 59. The underside of the wall 58 is lined with electrical insulating material 60, and the posts 59 have bottom portions 61 forming spaced contacts disposed below the material 60. The bottom wall 62 of the housing 57 has a depending sleeve portion 63 the open lower end of which slidably receives a cap 64 forming a plunger to which is secured a post 65. Post 65 extends upward through the sleeve 63 and has a conductor bridge 66 secured to its upper end and disposed above the bottom wall 62. A compression spring 67 is disposed in the sleeve 63 and cup 64 and around the post 65, and has its lower end bearing on the bottom of the cup 64 and its upper end bearing against a plate 68 which is secured to the bottom wall 62 and through which post 65 slidably extends.

Sleeve 63 extends downwardly through an opening in the upper platform 24, not shown, and the plunger 64 is disposed above the head of a bolt 69 which is threaded downwardly through a shelf 70, which is fixed to and extends outwardly from the base 16, above the platform 27. A lock nut 71 engages the bolt 69 and abuts against the underside of the shelf 70 to retain the bolt head in different selectively adjusted positions above the shelf 70. Platform 27 has an opening 72 to accommodate the lower end of the bolt 69 and nut 71. Switch 56 is interposed in the positive conductors 54, and said switch has a wall of electrical insulating material 73 extending upwardly from its top wall 58 between posts 59 to prevent contact between the sections of the positive conductors 54 which engage the two posts 59.

Compressor spring 42 normally retains the motor mounting bracket 32 and the platforms 24 and 27, which are pinned thereto, in their elevated positions of FIGS. 1, 2, 4 and 6, in which positions the drive wheel 51 is out of engagement with the tire 20 and the sheaf or sleeve 48 is in its full line position of FIG. 1, in which position the cable 39 retains the lever 45 in its full line elevated position of FIG. 1. When in this position, the parts of the switch 56 are in their positions of FIG. 5 with the conductor bridge 66 out of engagement with the contacts 61 for interrupting the electric circuit between the motor 49 and the battery 53.

Figure 3:
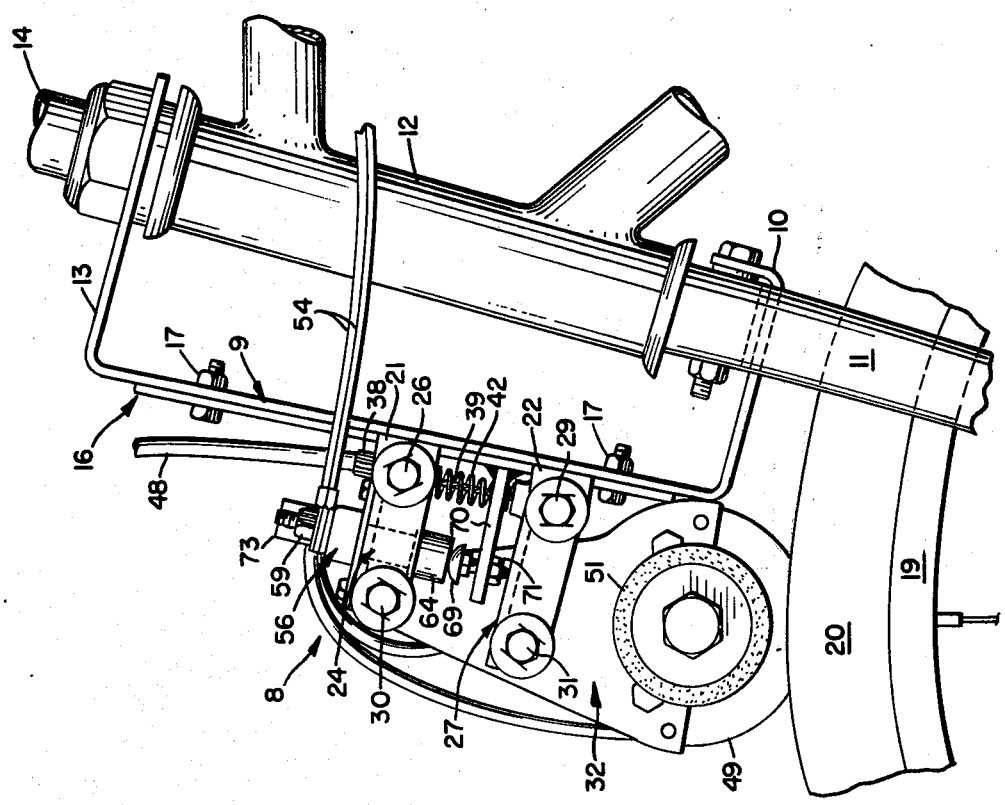
FIG. 3 is a view corresponding to FIG. 2, except that the drive unit is shown in an operative drive position.

When a gripping force is applied by the rider of the bicycle to the lever 45 and handgrip 44 for swinging the lever 45 from its full line to its dotted line position of FIG. 1, an upward pull is exerted on the lower portion of the cable 39. However, the cable clamp 41 abuts the underside of the stationary lip 40 so that the lower part of the cable cannot move upwardly. Consequently, the pull exerted by the lever 45 on the upper end of the cable 39 in a direction from right to left, as seen in FIG. 1, causes the sheath 48, in which the cable 39 is slidably encased between the clamp 43 and cable adjuster 38, to move from its full line to its dotted line position of FIG. 1. As the upper end of the sheath 48 is prevented from yielding by engagement with the clamp 43 which is immovably disposed relative to the base 16, the sheath 48 exerts a downward thrust on the cable adjuster 38, sleeve 37, fastening 35,36 and the part 34, which is an integral part of the motor mounting bracket 32. As said motor mounting bracket 32 is pinned to the platforms 24 and 27 so that it has no swinging movement relative to the base 16, said bracket 32 exerts a downward pressure on the platforms 24 and 27 causing them to swing downwardly about their pivots 26 and 29, respectively, to permit the bracket 32 to move downward with the motor 49 and drive wheel 51, for moving the drive wheel into engagement with the tire 20, as seen in FIG. 3, and in dotted lines in FIG. 1.

As this occurs, the switch 56 swings downwardly with the platform 24. As the plunger 64 is engaging the stationary bolt 69 this downward movement of the switch 56 will result in said switch moving relative to the plunger 64, so that the spring 67 will be compressed and the contacts 61 will move downwardly into engagement with the conductor bridge 66 for completing a circuit across the switch between the separated portions of the conductors 54, for energizing the motor 49 to drive the wheel 51 clockwise, as indicated by the arrows 74, in FIG. 3, for driving the front wheel tire 20 counterclockwise, as indicated by the arrows 75, for propelling the vehicle in a forward direction.

When the gripping force is thereafter released from the lever 45, the compressed spring 42 will force the fastening 35,36 and the mounting bracket 32 upwardly for raising the drive wheel 51 out of engagement with the tire 20 and for swinging the platforms 24 and 27 upwardly to release the pressure on the plunger 64, so that the spring 67 can return the switch 56 to its open position of FIG. 5. The upward movement of the cable adjuster 38 will allow the sheath 48 and the cable portion disposed therein to resume the full line position of the sheath 48, as seen in FIG. 1, and so that the cable can exert a pull on the lever 45 to swing it upwardly about its pivot 46 from its dotted line to its full line position of FIG. 1.

Various modifications and changes are contemplated and may be resorted to, without departing from the function or scope of the invention.

I claim as my invention:

1. An electric drive unit for a vehicle having a front fork, a handlebar connected to said front fork, a front wheel rotatively mounted in said fork, and a tire mounted on said wheel, said drive unit comprising support means secured to said fork, a motor supporting bracket, means connecting said motor supporting bracket to said support means for up and down movement, an electric motor carried by the motor supporting bracket and having a drive wheel disposed over said tire, a clamp secured to the handlebar, a lever pivotally connected to the clamp for swinging movement toward and away from a part of the handlebar, a cable having a lower end connected to a part of the support means and an upper end connected to said lever and slidably engaging said clamp, said motor supporting bracket having a part slidably engaging said cable above the connection of the cable to the support means, a flexible sheath in which a part of the cable is slidably encased, said sheath being formed of a material incapable of contracting, said sheath having one end abutting said clamp and an opposite end abutting said part of the motor supporting bracket which slidably engages the cable, whereby when the lever is swung toward the handlebar for exerting a pull on the cable end connected thereto said sheath will be distorted for exerting a downward thrust on said part of the motor supporting bracket engaged thereby, for displacing said bracket downwardly to move the drive wheel into engagement with said tire, a compression spring interposed between a part of the support means and a part of said motor supporting bracket for raising the motor supporting bracket to move the drive wheel out of engagement with the tire when pressure is released from said lever and for returning the cable and sheath to their normal positions, said means connecting the motor supporting bracket to the support means including upper and lower platform members extending outwardly from said support means, means pivotally connecting the platform members to the support means for up and down swinging movement, means carried by each platform member and swivelly engaging said motor supporting bracket and forming a connection between said bracket and the support means, said last mentioned means being spaced outwardly from said platform pivots, a current source carried by said vehicle, an electric circuit connecting said motor to said source, said circuit including a normally open electric switch supported by and movable with one of said platform members and a stationary switch actuator carried by the support means for engaging and closing the switch when the motor supporting bracket is displaced downwardly.

2. An electric drive unit for a vehicle having a front fork, a handlebar connected to said fork, a front wheel rotatively mounted in said fork, and a tire mounted on said wheel, said drive unit comprising support means secured to said front fork, an upper platform and a lower platform, each platform having an inner end, an outer end and side flanges, means pivotally connecting said side flanges to said support means at the inner ends of said platforms and with the platforms in vertically spaced relation to one another for up and down swinging movement relative to the support means, a motor supporting bracket comprising a plate disposed on one side of said platforms, means pivotally connecting the plate to one flange of each platform adjacent the outer ends of said flanges and with said platforms disposed substantially parallel to one another, an electric motor carried by said motor supporting bracket and having a drive wheel disposed over said tire, a clamp secured to the handlebar, a lever pivotally connected to the clamp for swinging movement toward and away from a part of the handlebar, a cable haivng a lower end connected to a part of the support means and an upper end connected to said lever and slidably engaging said clamp, a sleeve carried by said plate and slidably engaging said cable above the connection of the cable to the support means, a flexible sheath in which a part of the cable is slidably encased, said sheath being formed of a material capable of contracting and having one end abutting said clamp and an opposite end abutting said sleeve, whereby when the lever is swung toward the handlebar for exerting a pull on the cable end connected thereto said sheath will be distorted for exerting a downward thrust on the motor supporting bracket through said sleeve for displacing said bracket downwardly to move the drive wheel into engagement with the tire, and a current source carried by the vehicle and connected to the motor for driving the motor and said drive wheel in a direction for propelling the vehicle in a forward direction, and spring means interposed between the support means and the motor supporting bracket for holding the drive wheel out of engagement with the tire when the lever is released from exerting said pull.

3. An electric drive unit as in claim 2, and a switch interposed in the electric circuit of said motor.

4. An electric drive unit as in claim 3, said switch being normally open, means connecting said switch to the motor supporting bracket, and a stationary switch actuator supported by said support means and disposed to be engaged by the switch during downward movement thereof to effect closing of the switch.

5. An electric drive unit as in claim 2, said support means comprising a mount bracket secured to the front wheel fork and a mounting base adjustably secured to the mount bracket.

* * * * *